Sept. 16, 1924.                     1,508,677
L. G. CHASE
DIAGONAL FLOW METER
Filed April 28, 1920
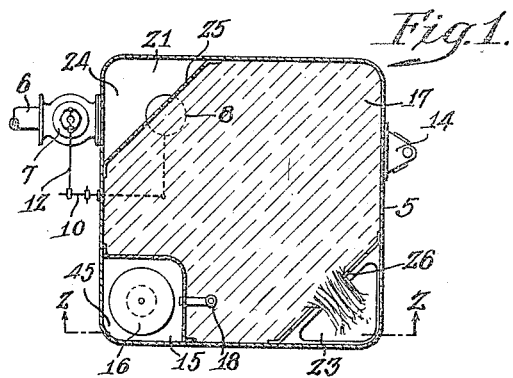
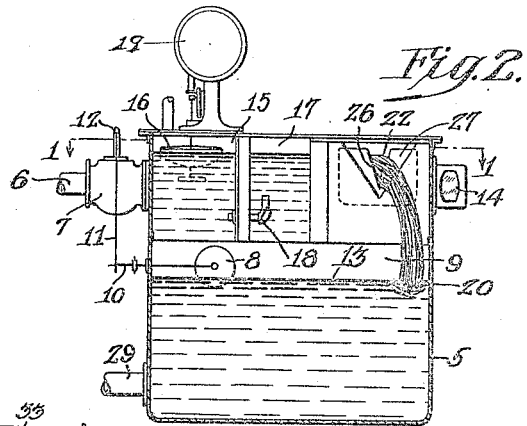
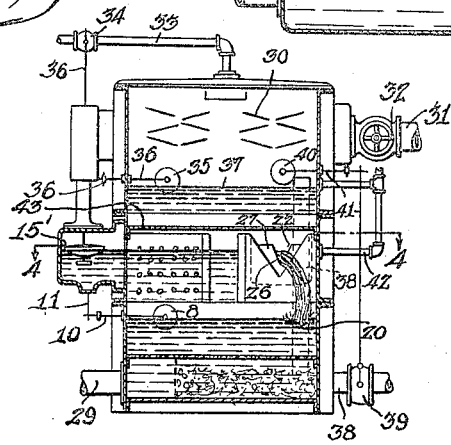
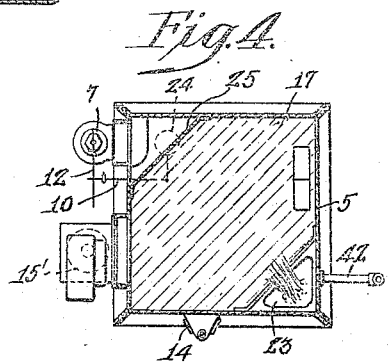
Inventor.
Lyle G. Chase.

Patented Sept. 16, 1924.

1,508,677

UNITED STATES PATENT OFFICE.

LYLE G. CHASE, OF PHILADELPHIA, PENNSYLVANIA, ASSIGNOR TO YARNALL-WARING COMPANY, OF PHILADELPHIA, PENNSYLVANIA, A CORPORATION OF PENNSYLVANIA.

DIAGONAL-FLOW METER.

Application filed April 28, 1920. Serial No. 377,861.

*To all whom it may concern:*

Be it known that I, LYLE G. CHASE, a citizen of the United States, residing at 118 E. Moreland Ave., Philadelphia, in the county of Philadelphia and State of Pennsylvania, have invented a certain new and useful Diagonal-Flow Meter, of which the following is a specification.

My invention relates to meters of the weir type having rectangular meter boxes such as are used in measuring the flow of liquids by interpretation of the height of the liquid flowing in the box; and applies equally to these meters whether they be intended merely to indicate the amount of flow momentarily, to register or record the same or to integrate the flow.

The purpose of my invention is to improve conditions within the meter itself by increasing the length of flow between the inlet and the weir, or by permitting the use of a smaller weir box and chamber for the same length of flow.

A further purpose of my invention is to locate the weir at or near one corner of the chamber, preferably placing the inlet at or near the diagonally opposite corner thereof to give as great an extent of flow across the rectangle as possible.

Further purposes of my invention will appear in the specification and in the claims.

I have preferred to illustrate my invention by but one general form thereof, selecting a form which is practical, efficient and inexpensive, and which at the same time well illustrates the principles of my invention.

In the preferred form:—

Figure 1, is a transverse section upon line 1—1 of Figure 2.

Figure 2 is a vertical section of Figure 1, taken upon line 2—2.

Figure 3 is a vertical section corresponding to Figure 2, showing my invention applied in a combination with an open feed water heater.

Figure 4 is a section of Figure 3 taken upon line 4—4.

In the drawing similar numerals indicate like parts.

Almost all if not all existing weir meters have a rectangular meter box providing a rectangular meter chamber. They provide flow parallel or substantially parallel to the sides of this chamber. The rectangle has very generally been made longer between the inlet and the weir than across the chamber in order to provide for the space taken up by the inlet and to give undisturbed conditions of flow at the weir; making a structure, even with extra storage space beneath the chamber, considerably longer than it is wide. Aside from the lack of constructional economy of such a meter in many locations this extra length of the complete chamber is objectionable or even prohibitive and it is always desirable to confine the meter to as small a cross-section of floor area as possible.

Where the liquid, herein treated as water, is introduced at or near the middle of the side, opposite the weir, the cross-currents of water flow resulting from this inlet have required a little additional space in addition to the space for the inlet itself.

Though introduction of the water at or near one of the corners would help conditions a little, this would not in itself offer much benefit because of the irregular lines of distribution of water from it to a central weir, giving an unbalanced flow and correspondingly affecting the height of water over the weir notch and consequently the rate or quantity of flow. It would also affect the height of water in the float chamber.

Somewhat greater advantage may be secured by placing the weir at or near one of the corners; but here again this change alone secures but a part of the length of flow which can be secured and interferes with the regularity of supply of the water to the weir, produces cross currents and affects the accuracy.

However, by a combination of these I secure diagonal flow with less cross current than where the inlet and weir are at the centers of the sides. By providing inlet in or near one of the otherwise relatively waste corners of the weir chamber and providing outlet at or near the diagonally opposite corner thereof, I gain a maximum of distance between for a given square or rectangle of cross-section of the chamber and permit the float chamber to be placed at an intermediate corner a maximum distance from the inlet and weir. I also thus place the float chamber at a considerable distance from the direct line of flow of the liquid between the inlet and the weir locating it at one side, while maintaining its position within the weir meter casing.

Describing the constructions shown, without limiting to them:—

The casing of the weir meter shown at 5 is rectangular and preferably square. It is provided with an inlet at 6 through valve 7 controlled by a float 8 within the catch basin 9, and connections which are not new to this application, and which are indicated by rocker arm 10, link 11 and lever 12, so as to control the extent of inlet water supply inversely by the height of the catch basin water level at 13. The float is very desirably placed in one corner of the catch basin as far away as possible from the point at which the weir discharges into the catch basin.

The meter is provided with a sight window at 14 and a float chamber 15, containing a float 16 and to which fluid inlet from the weir chamber 17 is supplied through screen 18.

The catch basin 9 is of the extra storage type, extending beneath the body of the weir chamber 17.

The float is operatively connected with a suitable register or recorder whose casing is seen at 19. The particular type of inlet valve, inlet control, float chamber, float recorder, sight opening and weir opening, are not material here, and the weir chamber and catch basin shapes shown are material only in so far as they enter into combinations claimed with the other features of my invention. The extra storage type of catch basin is of great benefit in reducing the entire structure to a horizontal cross section substantially the same as that of the weir chamber. It also provides a maximum distance between the point 20 at which the weir discharge flows into the catch basin and the float 8.

By placing the inlet to the weir chamber in one corner, here shown as 21 and its discharge (the weir 22) at the diagonally opposite corner at 23, I give a maximum distance between them, permitting the same diagonal spacing between point 20 and the float. This spacing is the diagonal of the rectangle, here the diagonal of the square.

The inlet empties into a compartment 24, screened at 25 from the body of the weir chamber, so as to disturb the water in the weir chamber as little as possible.

The weir opening 22 is provided in a plate 26, diagonally placed in a partition 27, forming the corner 23 of the fluid space back of the weir, giving a maximum distance from the corner 21.

As so located the water discharging through the weir strikes the catch basin level at 20 at a corner diagonally opposite to the corner in which the float 8 is located, giving a maximum distance also between the point of impact of the water with the catch basin surface and the float. The water measured leaves the catch basin through pipe 29.

In Figure 3 I show the same general type of construction as in Figures 1 and 2, the differences being due to the accommodation of my invention to the structure of a meter section to be inserted below an open feed water heater. This insertable meter section was invented by Gustav A. H. Binz, and therefore is not claimed by me.

In this form the feed water heater is shown at 30 with steam inlet at 31, controlled by a valve 32 and with make-up water inlet at 33, controlled by a valve 34 from a float 35 and connections 36, a well-known form.

The float 35 controls the return water, checking its flow when the level 37 of the water in the storage space of the feed water heater is at a maximum and allowing full flow when this water is at the minimum intended. At a maximum height of water level 37 the water enters an overflow discharge pipe 38 controlled by a valve 39. This valve is opened, when the level exceeds the overflow, by a float 40 and connections 41. The pressure in the meter and heater may be equalized by a pipe 42, if desired.

The weir inlet and weir, and the impact point for the water received in the catch basin and catch basin float are shown in the same relations as in Figures 1 and 2.

The storage space of the heater is formed in the upper part of the section carrying the weir chamber, as shown at 43, and the float chamber is outside of the body of the weir chamber preferably near to a corner 45 between the inlet and weir corners, respectively, as is true also of the float chamber in Figure 1.

In operation, considering the weir chamber first, a maximum spacing is secured between the inlet and the weir, and the float chamber may be kept out of the line of flow and well spaced from both of them. At the same time the balanced divergence of the side walls of the weir chamber from the inlet to the middle and their convergence from that point to the weir promote smooth even flow substantially free from cross currents.

The use of the small corner spaces for the inlet, and particularly for the weir leaves a maximum of the cross section of the meter available for weir chamber use, securing a large volume of water and thus, from this standpoint also, reducing the possibility of inaccuracy from the effects of the inlet and discharge.

Considering the catch basin: the fact that the water falls into a corner of the catch basin from which the walls of the basin diverge uniformly toward the center reduces the initial disturbance as well as the ultimate effect of any initial disturbance in the distribution of the water within the catch basin pool.

It will be evident from the two illustrations of the application of the preferred form that my invention is useful in various differing applications of the meter and that many other modifications and changes may be made in it as well as in the connections or setting within which it is placed without departing from its spirit and scope.

Having thus described my invention, what I claim as new and desire to secure by Letters Patent is:—

1. A weir meter having a weir plate, a chamber back of the weir plate of general rectangular horizontal cross section, and having the inlet to the chamber located in proximity to one of the corners of the rectangle, in combination with a baffle across the corner in which the inlet is located.

2. A weir meter having a weir chamber of general rectangular horizontal cross section, and a weir plate for the weir placed diagonally across one of the corners of the rectangle.

3. A weir meter having a weir chamber of general rectangular horizontal cross section, an inlet in proximity to one corner thereof and a weir plate located in proximity to the diagonally opposite corner of the rectangle.

4. A weir meter having a weir chamber of general rectangular horizontal cross-section, in combination with an inlet and a diagonal weir plate for the chamber so located that the line of flow therebetween is diagonal to the sides of the rectangle.

5. A weir meter having a weir chamber of general rectangular horizontal cross-section in combination with an inlet and a weir plate for the chamber so located on opposite sides of the longitudinal center plane of the chamber that the line of flow therebetween is diagonal to the side of the rectangle and a float chamber located to one side of the line of flow.

6. In a weir meter, a weir chamber of rectangular horizontal cross section having an inlet approximately at one corner of the chamber, in combination with a diagonal weir plate located approximately at the diagonally opposite corner of the chamber.

7. A weir meter having a weir chamber of rectangular horizontal section and an inlet to the chamber approximately at one corner and a weir plate, approximately at the diagonally opposite corner in combination with a catch basin located directly beneath the weir chamber and receiving the flow from the weir approximately in a corner of the catch basin.

8. A weir meter having a weir chamber of rectangular horizontal section and an inlet to the chamber approximately at one corner and a weir plate approximately at the diagonally opposite corner, a catch basin located directly beneath the weir chamber and receiving the flow from the weir approximately in a corner of the catch basin, a float in the catch basin substantially beneath the inlet, a valve controlling the inlet to the weir and connections between the float and the valve to open and close the valve with lowering and rising levels of water in the catch basin.

9. In a weir meter, a weir chamber having an inlet and a weir plate discharge, a catch basin receiving the discharge from the weir plate substantially in a corner of the catch basin, a float in the catch basin substantially at the diagonally opposite corner thereof, a valve controlling the inlet to the weir and connection beneath the float and the valve to open and close the valve with lowering and rising levels of water in the catch basin.

10. A weir meter having the weir chamber of general rectangular form, inlet at one corner thereof and outlet at the diagonally opposite corner thereof, to give diagonal flow, in combination with a weir plate for the outlet located in a plane perpendicular to the path of diagonal flow.

11. In a weir meter, and weir chamber of general rectangular cross section, and having an inlet thereto, in combination with a weir plate discharge therefor located approximately in one corner of the rectangle and diagonally to the adjacent sides of the rectangle.

LYLE G. CHASE.